US008444485B2

(12) United States Patent
Collar et al.

(10) Patent No.: US 8,444,485 B2
(45) Date of Patent: May 21, 2013

(54) SEAMLESS USER NAVIGATION BETWEEN HIGH-DEFINITION MOVIE AND VIDEO GAME IN DIGITAL MEDIUM

(75) Inventors: Bradley Collar, Valencia, CA (US); Lewis Ostrover, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 414 days.

(21) Appl. No.: 12/536,363

(22) Filed: Aug. 5, 2009

(65) Prior Publication Data

US 2010/0087251 A1 Apr. 8, 2010

Related U.S. Application Data

(60) Provisional application No. 61/086,434, filed on Aug. 5, 2008.

(51) Int. Cl.
*A63F 13/00* (2006.01)
(52) U.S. Cl.
USPC ...... 463/30; 463/1; 463/31; 463/43; 386/200; 386/353
(58) Field of Classification Search .......... 463/1, 30–31; 386/200, 353
See application file for complete search history.

(56) References Cited

U.S. PATENT DOCUMENTS

| | | | |
|---|---|---|---|
| 6,219,041 B1 * | 4/2001 | Sturgeon et al. | 715/717 |
| 7,072,569 B2 * | 7/2006 | Lakhansingh | 386/243 |
| 7,542,659 B2 * | 6/2009 | Kozuka et al. | 386/241 |
| 7,616,863 B2 * | 11/2009 | Ando et al. | 386/333 |
| 2003/0161614 A1 * | 8/2003 | Yanagihara et al. | 386/95 |
| 2005/0084246 A1 * | 4/2005 | Yamagaka et al. | 386/95 |
| 2007/0140653 A1 * | 6/2007 | Kozuka et al. | 386/95 |
| 2007/0160345 A1 * | 7/2007 | Sakai et al. | 386/95 |
| 2007/0223876 A1 * | 9/2007 | Hashimoto et al. | 386/95 |
| 2007/0230917 A1 * | 10/2007 | Okada et al. | 386/108 |
| 2008/0298783 A1 * | 12/2008 | Jung et al. | 386/126 |
| 2009/0034931 A1 * | 2/2009 | Stone et al. | 386/52 |
| 2009/0269028 A1 * | 10/2009 | Tanaka et al. | 386/94 |

* cited by examiner

*Primary Examiner* — Dmitry Suhol
*Assistant Examiner* — David Duffy
(74) *Attorney, Agent, or Firm* — Novak Druce Connolly Bove + Quigg LLP; Jonathan Jaech

(57) ABSTRACT

Seamless navigation is provided between high-definition audio-video content configured for use with a media player application, and an executable video game packaged with the audio-video content on a digital medium. An API module is distributed to player/consoles. An application provided with the high-definition audio-video content detects the presence of the API module on the player device. In response to detecting the API module, the application provides an interactive feature that uses the API module to load and execute the executable video game in response to user input.

21 Claims, 4 Drawing Sheets

SEAMLESS USER NAVIGATION BETWEEN HIGH-DEFINITION MOVIE AND VIDEO GAME IN DIGITAL MEDIUM

CROSS-REFERENCE TO RELATED APPLICATION

This application claims priority pursuant to 35 U.S.C. §119(e) to U.S. provisional application Ser. No. 61/086,434, filed Aug. 5, 2008, which is hereby incorporated by reference, in its entirety.

BACKGROUND

1. Field

The present disclosure relates to a system and method for enabling seamless user navigation between a high-definition movie and a video game encoded together in a digital medium.

2. Description of the Related Art

For a given movie or other audio-video content property, a studio may publish and distribute several derivative or related products in various distribution packages. For example, for a given movie property, a studio may publish and distribute the movie on a DVD disc or a Blu-ray® disc, while distributing a thematically related video game, for example, a game console video game, e.g. PlayStation 3® game, or a video game configured for play on a personal computer. In some instances the studio may wish to distribute the video game inside the same distribution package as the DVD or Blu-ray® disc product, perhaps for cross-marketing purposes. For example, a Blu-ray® movie and game console video game may be distributed together on the same disc medium; however, the concepts discussed herein may also be applied to combinations of audio-video content and video games using other data standards or formats, and on various media.

Characteristically, the high-definition movie or other audio-video content is configured for playing using a media player application installed on a player/console device, and principally comprises audio-video data defining successive frames of a video production that cannot be transformed into useful audio-video output (e.g., a movie showing) without using a compatible application installed on a player device. The media player application may be pre-installed on the player device, or provided with the audio-video content. In comparison, the video game is characteristically an application bundle including both executable code and static audio-video data for processing by the executable code to produce successive frames of video output. The executable code is not pre-installed on the player/console device. The video game's executable code is configured for installation and execution through a compatible console's operating system, sometimes referred to as a user interface. Once installed and executing on the compatible console from the distribution package, the video game executable code accesses the static video game audio-video data to generate video game output that is responsive to input from a user interface device. Characteristically, the video game executable cannot be used to view or access the frame-based audio-video content, and the media player application cannot be used to access the video game's static audio-video output to provide video game output.

Combined distribution of a Blu-ray® movie and an executable video game has been accomplished by either including a second disc in the Blu-ray® package or by manufacturing a double-sided disc that contains a Blu-ray® movie content on one side and an executable video game content on the other side. However, both of these solutions are less than ideal, since it requires the consumer to swap discs or flip the disc over in order to switch between the Blu-ray® movie and video game, disrupting what might otherwise be a seamless user experience. It would be desirable, therefore, to provide a system or method that overcomes this and other limitations of the prior art.

SUMMARY

An apparatus and method are disclosed herein for providing digital audio-video content and an executable video game encoded together in a single medium, configured so as to permit seamless transitions between viewing the audio-video content and executing the video game. The executable video game is not capable of processing the frame-based audio-video content to provide a display output; that function is performed by a distinct and separate media player application operating on the media player device.

As used herein, "frame-based audio-video data" refers to data that defines successive frames (including keyframes and interframe data) used to generate a predetermined succession of video frames with accompanying audio, usually after the data undergoes an image decompression process. Frame-based audio-video data may include, for example, DVD data or Blu-ray® movie data. "Static audio-video data" refers to textures, data that mathematically models physical spaces or objects, audio sound bite files, viewpoint and camera data, and other data used for producing interactive audio-video output using a game engine. Video game data may also include some frame-based audio-video data used, for example, to generate short video clips in response to pre-defined game events. However, to enable a high degree of interactivity, the video game's data core should comprise mainly static audio-video data for processing by a game engine. Conversely, frame-based data may include some static elements used to generate menu screens and menu objects. Nonetheless, it should be apparent that media player applications and video game applications perform fundamentally different, non-interchangeable processing tasks to provide their respective audio-video outputs.

Frame-based audio-video content and an executable video game may be encoded together on a single digital medium, for example, on a single Blu-ray® (or other high-definition video format) disc. Such a disc may, for example, include both a Blu-ray® movie and video game on the same disc side. The Blu-ray® movie data and video game data may be logically separated on the single Blu-ray® disc such that when inserted into a conventional media player device (e.g., a Blu-ray® player) only the frame-based movie data is read and played back by the player.

In the absence of the technology disclosed herein, when the same disc medium is inserted into a game console, for example, PlayStation 3®, the user is provided the choice of playing either the frame-based movie or video game by selecting it via the game console's user interface, e.g. PlayStation 3® cross media bar. However, once the user makes the initial selection and chooses either the movie or video game the user cannot easily switch between the two. For example, if the user initially chooses the movie from the game console's user interface the user must stop playback of the movie and return to the game console's user interface to subsequently select the video game. Therefore, in the absence of the technology disclosed herein, even if the video game data and movie are provided on the same side of a high-density disc, the user is unable to select the video game from within the frame-based movie's menu interface. Likewise if the user initially chooses the video game from the game console's user interface the user must stop playback of the video game and return to the game console's user interface to subsequently select the play of the frame-based movie data. Therefore, in the absence of the technology disclosed herein, the disc encoded with both a movie and a video game also fails to enable the user to select the frame-based movie from within the video game's menu interface.

This limitation may be overcome to allow for seamless user navigation between a Blu-ray® movie or other frame-based high-definition encoded video to a video game (or vice versa) that reside on the same disc side, using a conventional video game console, for example, a PlayStation 3® game console. For example, from within the console's movie's menu interface the user is enabled to make a selection which switches from the Blu-ray® movie to the video game without the need to first stop playback of the Blu-ray® movie and navigate to the game console's user interface, using a specially configured API operating on the media player. Similarly, while operating the video game application, the user is enabled to switch from the video game directly to the movie without the need to first exit the video game and initiate play of the movie data from the console's user interface. In both cases, the transition between movie and video game may be done immediately from within whichever application is currently operating, and is therefore referred to herein as "seamless navigation."

Seamless navigation may be achieved by preparing an API module and distributing the API module to player/consoles. An application provided with the frame-based high-definition audio-video content, for example, a media player application or a plug-in for it, is configured to detect the presence of the API module on the player device. In response to detecting the API module, the application provides an interactive feature that uses the API module to load and execute the executable video game in response to user input. Seamless navigation from the video game to the movie content may similarly be achieved by configuring the video game to provide an interactive feature that uses the API module to initiate the media player application and play the movie content in response to user input.

Further details and features of the present technology are described in the detailed description that follows.

DESCRIPTION OF DRAWINGS

In the figures and in the detailed description, like element numerals are used to indicate like elements appearing in the figures.

DETAILED DESCRIPTION

Figure 1:
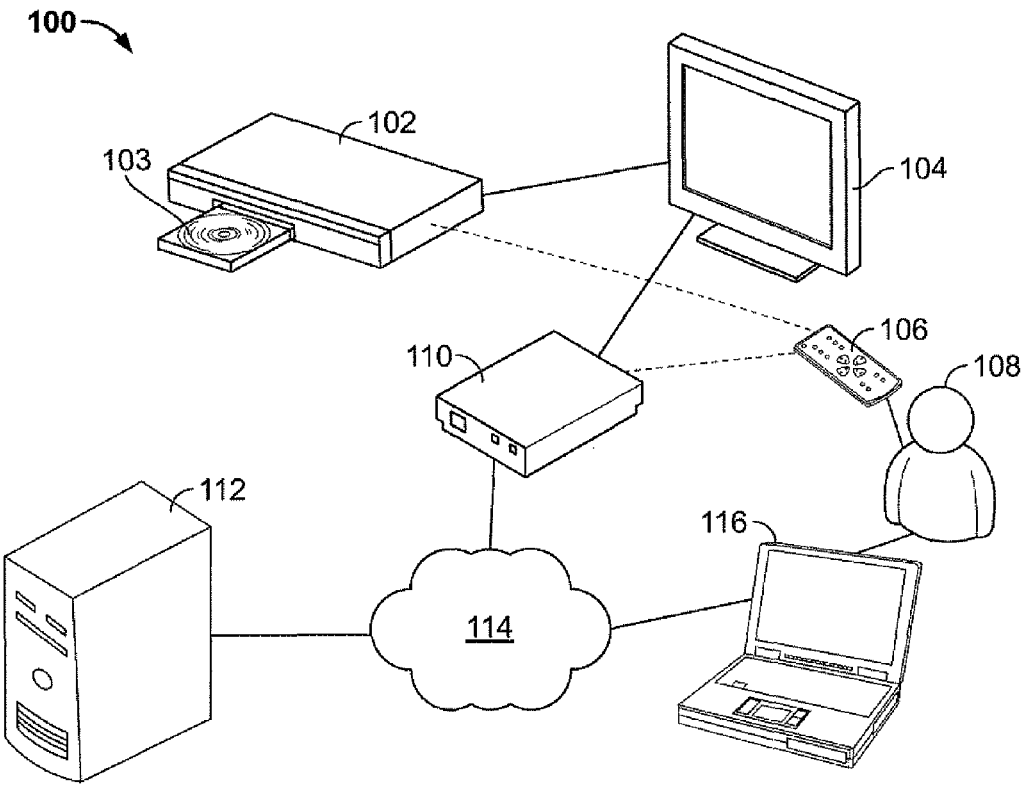
FIG. 1 is a system diagram showing high-level elements of a system in which digital audio-video content and an executable video game encoded together in a single medium may be configured and operated so as to permit seamless transitions between viewing the audio-video content and executing the video game.

FIG. 1 shows a system 100 for providing frame-based audio-video content and an executable video game encoded together in a single medium 103, configured so as to permit seamless transitions between viewing the audio-video content and executing the video game. The audio-video content may be played using a first application executing in a processor of a media player device 102. The application processes the audio-video data to provide an audio-video signal for a display device 104, and may perform other functions such as navigating to different locations or files, fast-forward, pause, reverse, and so forth, in response to signals from a user input device 106. The user input device may be operated by a user 108. In the alternative, or in addition, the audio-video content and video game application may be transmitted to a set-top box 110, or to a client computer 116, from a source 112 via any suitable communications network 114. The set-top box 110 or client 116 may store the audio-video content and video game application together on any suitable storage medium.

Figure 2:
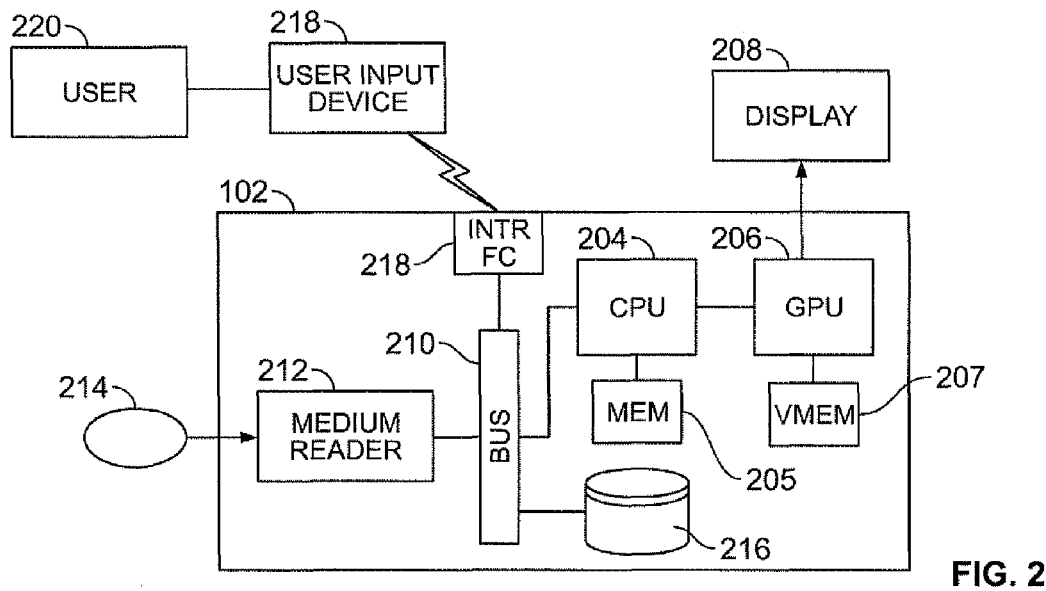
FIG. 2 is a block diagram showing an example of an apparatus and ancillary elements for receiving an article in which digital audio-video content and an executable video game are encoded together, and playing the encoded data so as to permit seamless transitions between viewing the audio-video content and executing the video game.

FIG. 2 shows an example of a media player 102 and some illustrative components. The media player 102 may comprise, for example, a central processing unit (CPU) 204 in communication with a graphics processing unit (GPU) 206. CPU 204 may be connected to memory 205 and GPU 206 to video memory 207. The GPU 206 may be configured to process a data signal from CPU 204 to provide a graphics output as used in video game applications. Graphics output may be further processed by a video processor (not shown) to provide a video signal to a display device 208. The CPU 204 may communicate with various peripheral devices via a data bus 210, for example, with a digital medium reader 212 configured to read an article 214 encoded with data as described herein, with an internal data storage device 216, and with a wireless interface device 218. The wireless interface device 218 may receive a wireless signal from a user input device 218, for example, a remote control or game controller operated by user 220.

CPU 204 may execute software and applications stored in storage device 216 by loading into memory 205. Applications may also be loaded from an inserted medium 214, for example, an optical disc. Media reader 212 may comprise a disc reader configured for reading Blu-ray® media. A familiar example of a game console generally consistent with depicted player 102 may be found in the PlayStation 3® game console, which can play Blu-ray® and DVD media discs as well as video games configured to operate on the PlayStation® platform.

Figure 3:
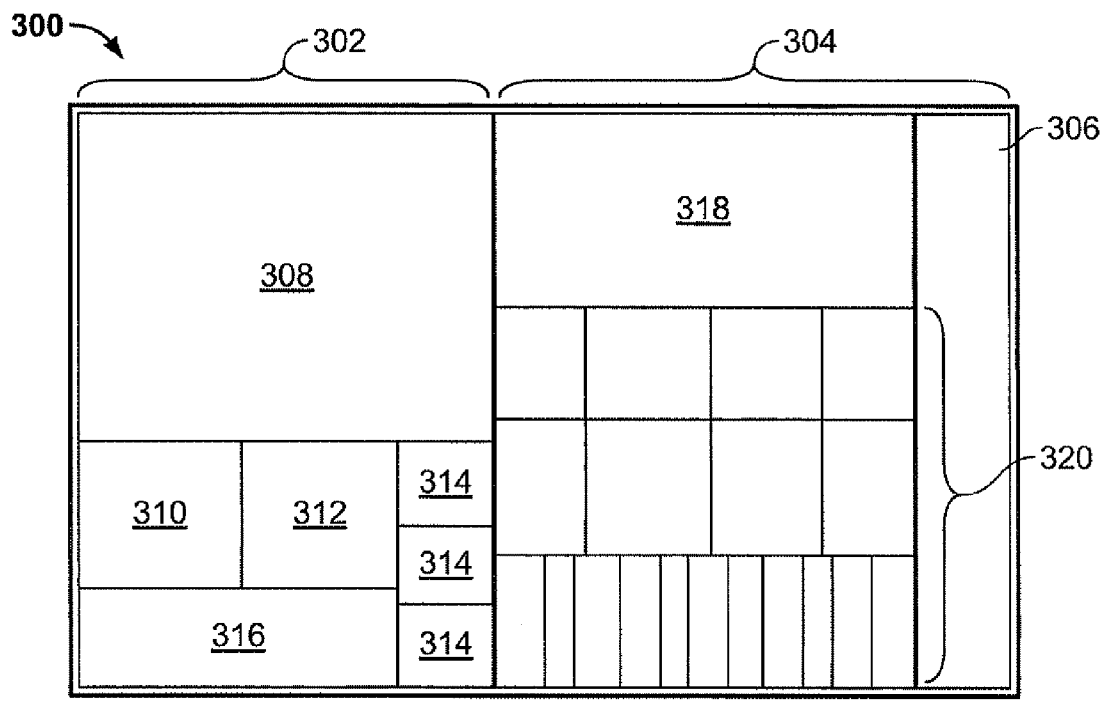
FIG. 3 is a schematic diagram illustrating different data and executable elements including frame-based audio-video content and an executable video game encoded together on an integrated medium to enable seamless transitions between viewing the audio-video content and executing the video game.

FIG. 3 diagrams an integrated dataset 300 for encoding on a medium such as a media disc 214 for use in a device such as media player/console 102 to enable seamless transitioning as described herein. The dataset 300 comprises different data and executable elements including frame-based audio-video content 302 and an executable video game and data 304 encoded together on an integrated medium to enable seamless transitions between viewing the audio-video content and executing the video game. A third portion 306 of the dataset may consist of an application program interface (API) for installing on the media player device. In the alternative, the API 306 may be provided to the media player via a separate medium or transmission path. For example, the high-definition movie and video game may be contained within a virtual package that is not encoded on an optical disc. For further example, the movie and video game may be stored as encoded data on a magnetic memory, non-volatile computer memory (e.g., flash memory) or by an electronic memory device. In another embodiment the movie may include an application (for example, a BD-J application in a Blu-ray® movie) that downloads the video game data from a server and stores the video game into persistent storage or removable storage on the media player device.

It should be appreciated that the dividing lines shown in FIG. 3 are purely conceptual and do not represent an actual appearance of encoded data. Instead, data on the medium is delimited according to the applicable protocol (e.g., Blu-ray, DVD, or other data standard), such as by using a file system.

Frame-based audio-video content 302 may comprise one or more video sequences, for example, a main feature 308 and ancillary features 310, 312. Each of these may comprise separate features that may be selected off of a menu displayed by the player device, or otherwise navigated to in response to user input or by internal logic defined for the frame-based video content. In addition, content 302 for generating a movie or the like may include static graphical objects 314 such as menus, graphical icons, or photographs used to support presentation and playback of the primary video content. Tying all these elements together may be an application or executable logic 316 configured to control presentation and use of the primary video content, which is configured to be loaded by the media reader according to the applicable standard.

The executable game and data 304 may comprise one or more executable applications 318 defining the interactive operation of a video game, and numerous graphical or audio files 320 (e.g., static graphical objects, data models of environments and objects, viewpoint and camera data, audio clips, or video clips). These data files may provide the data enabling presentation of the game environment and game action according to the logic embedded in the game engine 318. The game engine 318 is therefore configured to operate on graphical and mathematical model data in response to user inputs to generate an indeterminate video output responsive to user input. In contrast, video data files 308, 310 and 312 fully define high-definition predetermined video output and merely need to be decompressed and converted to a useful video signal for a display device.

Figure 4:
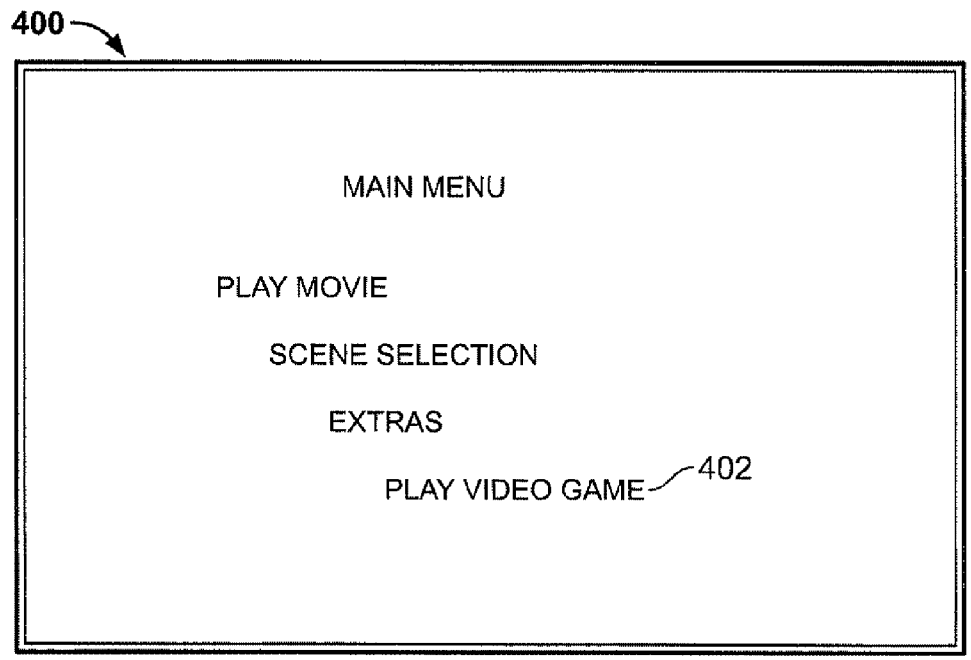
FIG. 4 is a simplified screen shot showing examples of menu elements for enabling a seamless transition to execution of a video game from within a disc menu.
Figure 5:
FIG. 5 is a simplified screen shot illustrating a display enabling a seamless transition to execution of a video game while frame-based audio-video content is playing.

To enable seamless transitions between play of frame-based video data by a media player and executable video game, an application programming interface (API) may be defined that can be utilized during the movie authoring process, for example, during authoring of a Blu-ray® movie for encoding on a disc medium. A link to the API 306 may be integrated into the Blu-ray® Java (BD-J) application 316 that resides in the Blu-ray® movie such that the relevant function of the API is called and executed when the user activates a graphical button that appears on the display screen, for example, a menu button 402 configured to indicate "Play Video Game" in a menu 400 (FIG. 4). When the menu button 402 is selected by the user, the game console will recognize the API, for example, SWITCH_TO_GM_CON( ) and subsequently switch playback from the Blu-ray® movie to the video game. API 306 may be loaded into firmware for the media player using an update process, or accessed from the medium holding dataset 300. For further example, a graphical icon 502 as shown in FIG. 5 may be programmed in the BD-J application to appear during one or more scenes of the frame-based video content 500. In response to user input indicating selection of the icon, the BD-J application may call the SWITCH_TO_GM_CON( ) API function. Any desired user input may be configured to trigger a call to the SWITCH_TO_GM_CON( ) API function, at any desired time during play of the frame-based video content 302.

Since the API SWITCH_TO_GM_CON( ) is newly defined, some existing playback devices may not recognize the API and therefore may return an exception, i.e. an error, or perhaps a null value when the API is executed. As a result the playback may not be switched from the Blu-ray® movie to the video game, depending on whether or not the API is recognized by the player. To eliminate this problem a device type field, DEVICE_TYPE, may be defined and stored into the internal memory of the game console and/or Blu-ray® movie player. An additional API function, GET_DEVICE_TYPE( ) may be defined such that the Blu-ray® movie BD-J application may query the device it is in to determine if it is a game console or not. It is important to note that the BD-J application can query the device type prior to presenting the "Switch to Video Game" menu button to the user.

Newer game consoles and Blu-ray® movie players will include the DEVICE_TYPE field such that when the BD-J application executes the GET_DEVICE_TYPE( ) API it will return a value of GAME_CONSOLE if the device is a game console or BD_MOVIE_PLAYER if the device is a conventional Blu-ray® movie player. If the return value is GAME_CONSOLE the BD-J application will present a "Switch to Video Game" or similar menu button to the user, whereas if the return value is BD_MOVIE_PLAYER the BD-J application will not present the "Switch to Video Game" menu button to the user, thereby avoiding the problem described above.

Legacy game consoles and Blu-ray® movie players may not contain the DEVICE_TYPE field at all, therefore when the BD-J application executes the GET_DEVICE_TYPE( ) API it will return an exception, i.e. an error, or a null value. In this instance the BD-J application may assume the device type is BD_MOVIE_PLAYER and therefore not present the "Switch to Video Game" menu button to the user. It is important to note that many legacy game consoles and Blu-ray® movie players may update internal firmware to include the DEVICE_TYPE field.

As mentioned earlier in the case where the DEVICE_TYPE=GAME_CONSOLE the BD-J application may present the "Switch to Video Game" menu button to the user, and in response to user activation of the described menu button, execute the SWITCH_TO_GM( ) API. However, in addition to just switching from the Blu-ray® movie to the beginning of the video game, additional control information, for example API command arguments, may be utilized to indicate the logical location within the video game to jump to, for example, to a particular game level and/or the difficulty setting within the game. For example, the API SWITCH_TO_GM(GAME_LEVEL, DIFFICULTY) includes two arguments such that SWITCH_TO_GM(4, 2) directs the game console to jump to level 4 within the game with a difficulty setting of 2. Other arguments not mentioned here may also be defined in the SWITCH_TO_GM( ) API, the described arguments merely providing an example. In the alternative, or in addition, a SWITCH_TO_GM( ) API may include a pointer to a metadata file already stored in the game console's memory. The metadata file may include information about previous game sessions, e.g. where the user left off, current score, or a pointer to existing saved game data.

Figure 6:
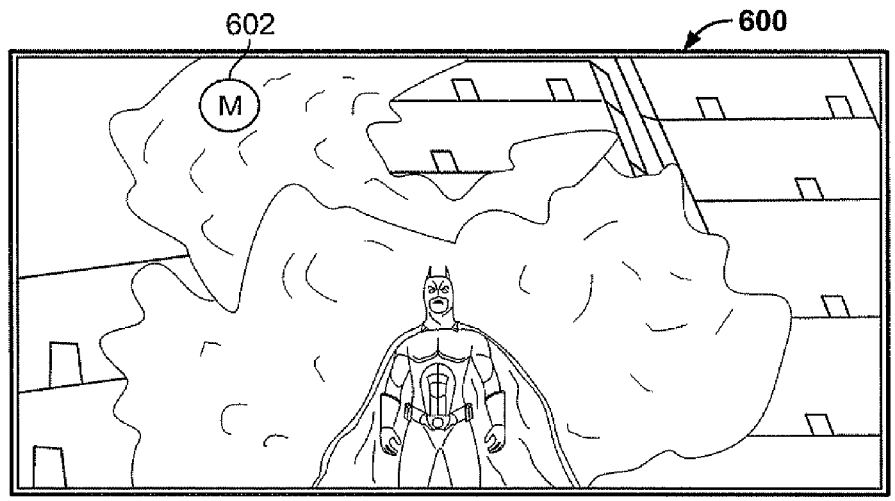
FIG. 6 is a simplified screen shot showing a display enabling a seamless transition to playing frame-based audio-video content from within a video game display.

Conversely, to enable seamless transitions from within the executable video game to the frame-based video content, the API may be defined to include a function, for example one labeled SWITCH_TO_PLYR( ) to handle such transitions. A link to the API may be integrated into the video game application 318 such that the relevant function of the API is called and executed when the user activates the user interface device to provide the input proscribed for calling the API function. For example, the video game application may be configured to output a graphical button that appears on the video screen, for example, a graphical icon 602 or other link appearing in a video game menu or other display output screen 600, as shown in FIG. 6. When the icon 602 is selected by the user, and in response to user input indicating selection of the icon, the video game application may call the SWITCH_TO_PLYR( ) API function. Any desired user input may be configured to trigger a call to the SWITCH_TO_PLYR( ) API function, at any desired time during play of the video game application 304.

The video game application and SWITCH_TO_PLYR( ) API function may also be configured to enable the passing of data arguments to the SWITCH_TO_PLYR( ) API function for initiating play at a desired point, in a desired file, and for a desired duration. For example, the SWITCH_TO_PLYR( ) function may be configured to receive the arguments FILE, START TIME and DURATION, where FILE identifies the particular frame-based video content file to play, START TIME indicates the point at which to begin play, and DURATION a length of time to play the video content before returning to the video game application. The SWITCH_TO_PLYR ( ) function may also operate to save the video game status when the transition is initiated as data arguments in a system memory, so that if or when play of the video game is resumed, it can resume in the condition and at the place where game play was left off.

Figure 7:
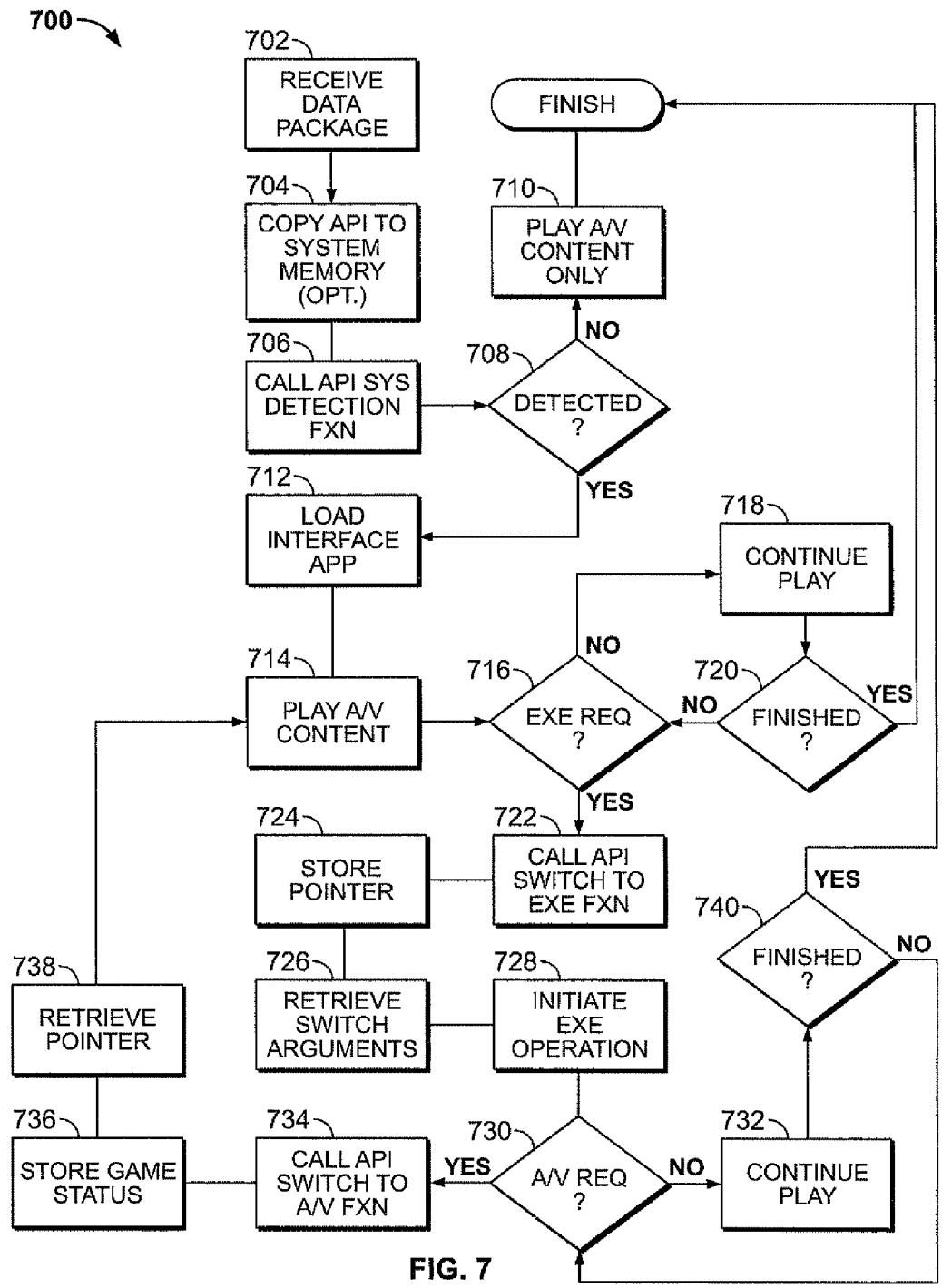
FIG. 7 is a flowchart showing an example of a method for media player operation to enable seamless transitions between execution of a video game and playing of frame-based audio-video content.

In accordance with the foregoing, FIG. 7 diagrams an example of a method 700 for media player operation, enabling seamless transitions between execution of a video game and playing of frame-based audio-video content. Delivery and receipt of a data package by the media player 702 may initiate the method. The data package may be as described in connection with FIG. 3 above, or one of the alternatives described in connection with FIG. 3. Essentially the data package should include the frame-based audio-video content, the video game application, and the API as described above.

Optionally, the API may be copied to a system memory 704, for example to firmware, of the media player device. This may occur at any time prior to receiving the audio-video content and game application 702. As noted above, provisions should be made to handle media players in which the required API is not properly installed. Accordingly, the data package should be provided with an application for detecting whether or not the API is properly installed on the media player device. Prior to beginning play of the received audio-video content or video game, the media player may call the detection function 706 as directed by an initialization function, which queries system memory to determine 708 whether or not the API is available on the media player. Optionally, the function may attempt to install the API from a fixed media (e.g., an inserted optical data disc holding data as described in connection with FIG. 3) or network source if the API is not detected. In response to detecting that no API is installed or can be installed, the media player may play the audio-video content 710 or video game without enabling seamless navigation capabilities in the video logic or game application.

In response to detecting that the required API for seamless navigation is installed or can be installed, the media player may play the audio-video content 710 or video game with seamless navigation enabled. According to the present example, this may be accomplished by loading an interface application or function 712, which is configured to respond to input from a user input device to call the API when desired. The interface application or function may be loaded or otherwise enabled prior to or during initialization of the audio-video content player, for example, by setting one or more state variables to a value that causes enablement of functions for indicating availability of seamless navigation and responding to user input to call API functions performing seamless navigation.

With seamless navigation enabled, the media player may play the audio-video content 714 until input is received from a user input device indicating that execution of the video game application is desired. In response to detecting the input requesting execution of the video game 716 using the interface function, the media player calls the designated switch function of the API 722 to terminate play of the audio-video content and initiate play of the game executable. Conversely, if no input requesting execution of the video game is detected, the media player continues play 718 until the audio-video content terminated normally 720 or such input is detected 716.

The switch function of the API may handle a switchover process via pointers, variables, or other data transfer means to the respective video content player applications and game executable. The actual transition may occur in innumerable way according to the desired result. For example, the API function called at 722 may push data to a memory location that causes the video player application to pause and display a message indicating that transition to the video game is in process. Then, the API switch function may store data indicating the file and timeline point at which the audio-video content is paused, for future reference 724; in the alternative, or in addition, this may be accomplished continuously during play of the audio-video content by the content-playing application operating on the media player. In addition, the API function may retrieve stored data recording variables or pointers for passing to the executable video game 726. The API function may then cause the video content application to terminate, and immediately initialize the video game executable, using the stored variables or pointers 728.

Once initialized, the video game application may operate normally to provide video game play. The video game application may include a built-in function operative on the media player/console to detect user input indicative of a request to seamlessly navigate to playing of the audio-video content, as previously described. In response to detecting such user input 730, the media player may call an API function for seamlessly navigating to play of the audio-video content 734. If not such user input is received 730, the video game application may continue operation until terminated normally 740 or until a seamless navigation request is detected 730.

The API function for seamlessly navigating to play of the audio-video content, once called, may pause play of the game and display a message indicating that a transition to a specific audio-video content is underway, e.g., "Playing of The Dark Knight will resume in a moment." In addition, the API function may execute on the media player to store any variables, pointers, or other data 736 indicating a state of the video game application at which play was interrupted by the request to navigate to play of the movie or other audio-video content. This stored data may be as retrieved in the converse operation 726. In the alternative, or in addition, such data may be stored by the video game application continuously during normal play.

At 738, the API function may retrieve variables, pointers or other data 738 for initiating play of the desired audio-video content at the indicated point. The data retrieved at 738 may be as stored in the converse operation 724. The API function may then cause the game application to terminate and initiate play of the audio-video content using the media player application provided with specified initialization data, if any. Play of the audio-video content may then continue 714 as previously described.

Figure 8:
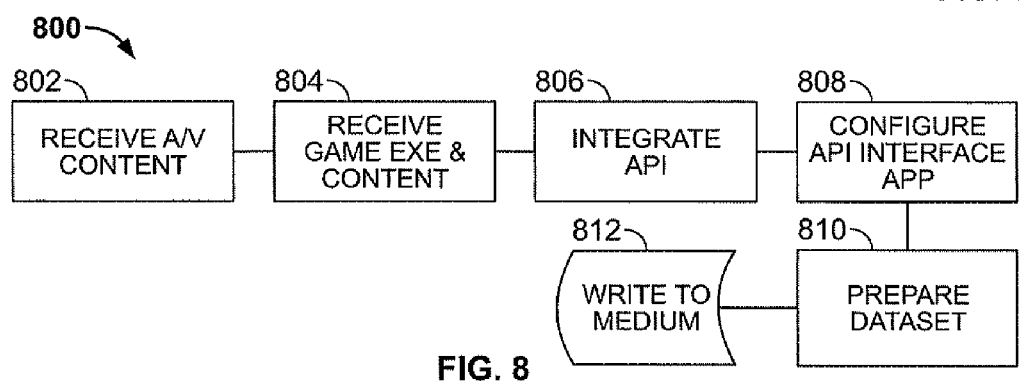
FIG. 8 is a flowchart showing an example of a method for producing a medium in which digital audio-video content and an executable video game are encoded together so as to permit seamless transitions between viewing the audio-video content and executing the video game.

An article with encoded data, for example an optical disc medium, thumb drive, or other memory device, may be configured to operate as described above. FIG. 8 shows an example of a method 800 for producing a medium in which digital audio-video content and an executable video game are encoded together so as to permit seamless transitions between viewing the audio-video content and executing the video game. Audio-video content, for example, a feature movie presentation and its ancillary content and functions may be received 802 using any suitable computing device. The audio-video content may be packaged with a specific media player application, or merely designed for play by a pre-existing application. It may also include logic, for example, BD-J applications for providing desired interactive features within a media player application.

Separately, a video game executable and ancillary data are received 804 by the computing device. The game executable may be received in source code form, or as a binary executable. The audio-video content is formatted to a defined and accessible standard, for example, Blu-ray®. The executable game and audio-video content may be received from different sources with no built in links yet provided.

At 808, executable code defining an API is compiled and integrated with the audio-video content and game executable, using one or more computers. The API is coded to operate with a particular operating system for the intended player/console devices, for example game players, set-top boxes, personal computers, or portable media devices. Program development and coding specifics may be appropriately selected by one of ordinary skill to comply with applicable specifications for the targeted devices or operating systems. Integration may include coordinating variables, pointers, and other data for passing to and from the game executable, media player application, and respective API functions as described above. Integration may further include providing interface modules to operate with or within the respective media player application and video game executable to call the API functions in response to input from one or more user input devices.

At 810, the one or more computers are used to prepare a data set suitable for encoded on the desired data medium. For example, a data set may comprise a collection of files arranged according to a file system, as described in connection with FIG. 3 above. In one embodiment, the data set complies with Blu-ray® specifications for encoding on a Blu-ray® medium. At 812, the data set is encoded on the desired medium, for example, on an optical disc medium, magnetic medium, or memory device, using any suitable method as known in the art. The encoded medium may then be provided to the targeted player/console devices for operation as described herein.

Having thus described a preferred embodiment of a system and method for enabling seamless navigation between high-definition audio-video content and an executable video game encoded together on a digital medium, it should be apparent to those skilled in the art that certain advantages of the within system have been achieved. It should also be appreciated that various modifications, adaptations, and alternative embodiments thereof may be made without departing from the scope and spirit of the present technology. For example, a Blu-ray® disc medium has been described, but it should be apparent that the novel concepts described above may be applied by one of ordinary skill to other forms of digital content packages to realize the benefits described herein.

What is claimed is:

1. A method comprising:
preparing, using at least one computer, a digital dataset for encoding on a single digital medium having both frame-based audio-video content and an executable video game encoded thereon, wherein the digital dataset comprises at least one frame-based audio-video content file configured for playing by a media player to produce motion picture output, and an interactive video game application comprising an executable file and graphic data files separate from the at least one frame-based audio-video content file and from the media player;
integrating an application program interface (API) in the digital dataset using the at least one computer, wherein the API includes a first function configured to terminate play of the at least one audio-video content file during play thereof and immediately initiate execution of the interactive video game application without any intervening user interface; and
integrating a programmed function in the digital dataset using the at least one computer, wherein the programmed function is configured to call the first function of the API in response to input from a user interface device during play of the at least one frame-based audio-video content file indicating that execution of the video game application should be initiated.

2. The method of claim 1, wherein the API further includes a second function configured to detect a device type of the media player, prior to calling the first function of the API.

3. The method of claim 2, wherein the programmed function is further configured to call the second function of the API prior to calling the first function of the API.

4. The method of claim 2, wherein the programmed function is further configured to call the first function of the API contingent upon confirming that the media player is of a designated suitable type.

5. The method of claim 1, wherein the first function of the API is further configured to receive arguments indicating a particular logical location within the video game application at which to initiate execution thereof.

6. The method of claim 1, wherein the API further includes a second function configured to terminate execution of the interactive video game application and initiate play of the at least one frame-based audio-video content file.

7. The method of claim 6, wherein the video game application is configured to call the second function of the API in response to input from a user interface device indicating that play of the at least one frame-based audio-video content file should be initiated.

8. The method of claim 6, wherein the second function of the API is further configured to store arguments in a memory of the media player, the arguments indicating a particular logical location within the video game application at which to resume play.

9. The method of claim 6, wherein the first function of the API is further configured to store position data in a memory of the media player, the position data indicating a particular position in the at least one frame-based audio-video content file at which to resume play.

10. The method of claim 9, wherein the second function of the API is further configured to receive the position data and resume play of the at least one frame-based audio-video content file at the particular position indicated by the position data.

11. A method comprising:
reading a single digital medium, having both frame-based audio-video content and an executable video game encoded thereon, using a game console, the digital medium containing encoded data comprising at least one frame-based audio-video content file configured for producing audio video output when played by a media player application and an interactive video game application comprising an executable file and graphic data files separate from the at least one frame-based audio-video content file and from the media player application;
installing an application program interface (API) in a system memory of the game console including a first function configured for initiating execution of the interactive video qame application, prior to playing the at least one frame-based audio-video content file by the media player application;
calling the first function of the API during play of the at least one frame-based audio-video content file by the media player application on the game console in response to input from a user interface device; and
immediately initiating execution of the interactive video game application via the API, without any intervening use of a user interface of the game console.

12. The method of claim 11, further comprising detecting a device type of the game console by calling a second function of the API, prior to calling the first function of the API.

13. The method of claim 11, further comprising calling the first function of the API in response to input from a user input device during play of the at least one frame-based audio-video content file by the media player application, the input indicating that execution of the video game application should be initiated.

14. The method of claim 12, wherein calling the first function of the API is contingent upon confirming that the game console is of a designated suitable type.

15. The method of claim 11, further comprising supplying the first function of the API with arguments indicating a particular logical location within the video game application at which to initiate execution thereof.

16. The method of claim 11, further comprising calling a third function of the API to terminate execution of the interactive video game application and initiate play of the at least one frame-based audio-video content file.

17. The method of claim 16, further comprising calling the third function of the API in response to input from a user input device during operation of the video game application, the input indicating that play of the at least one frame-based audio-video content file should be initiated.

18. The method of claim 16, further comprising storing data in a memory of the media player in response to calling the third function of the API, the data indicating a particular logical location within the video game application at which to resume play.

19. The method of claim 16, further comprising storing position data in a memory of the media player in response to calling the first function of the API, the position data indicating a particular position in the at least one frame-based audio-video content file at which to resume play.

20. The method of claim 19, further comprising, in response to calling the third function of the API, retrieving the position data and resuming play of the at least one frame-based audio-video content file at the particular position indicated by the position data.

21. A non-transitory computer-readable medium encoded with instructions, that when executed by a computer processor, cause a computing device to:
play a frame-based audio-video file encoded on the non-transitory computer-readable medium to produce audio video output conveying a motion picture or portion thereof in a media player interface, wherein the non-transitory computer-readable medium comprises an interactive video game application encoded in a file separate from the frame-based audio-video file;
prior to playing the frame-based audio-video file in the media player interface, load an application program interface (API) into system memory including a function configured for initiating execution of the interactive video game application;
while playing the frame-based audio-video file in the media player interface, call the function of the API, in response to user input; and
immediately initiate execution of the interactive video game application encoded on the computer-readable medium from the media player interface, via the API, without any intervening use of a separate user interface of the computing device.

* * * * *